United States Patent [19]

Nitcher et al.

[11] Patent Number: 4,756,978

[45] Date of Patent: Jul. 12, 1988

[54] BATTERY AND MOUNT

[76] Inventors: Walter Nitcher, 1712 Marilon Dr., Columbus, Ga. 31906; Emil Nitcher, 5013 McCaghren Dr., Columbus, Ga. 31904

[21] Appl. No.: 932,264

[22] Filed: Nov. 19, 1986

[51] Int. Cl.⁴ .................. H01M 2/06; H01M 2/30
[52] U.S. Cl. ............................. 429/1; 429/96; 429/178; 429/187; 429/123; 180/68.5
[58] Field of Search .................. 429/1, 179, 178, 187, 429/176, 123, 96, 100, 98, 163; 180/68.5

[56] References Cited

U.S. PATENT DOCUMENTS

| | | | |
|---|---|---|---|
| 1,519,701 | 12/1924 | Poth | 429/96 |
| 1,542,676 | 6/1925 | Drake et al. | 429/96 |
| 1,903,448 | 4/1933 | Furtney | 429/179 |
| 3,309,235 | 3/1967 | Teeple, Sr. | 429/98 |
| 4,435,486 | 3/1984 | Pomaro et al. | 429/1 |

Primary Examiner—Anthony Skapars
Attorney, Agent, or Firm—Thomas & Kennedy

[57] ABSTRACT

A battery has flat terminals mounted to its underside arranged to contact and be supported upon flat electrodes mounted adjacent to the floor of an open-top receptacle in which the battery may be manually placed.

10 Claims, 2 Drawing Sheets

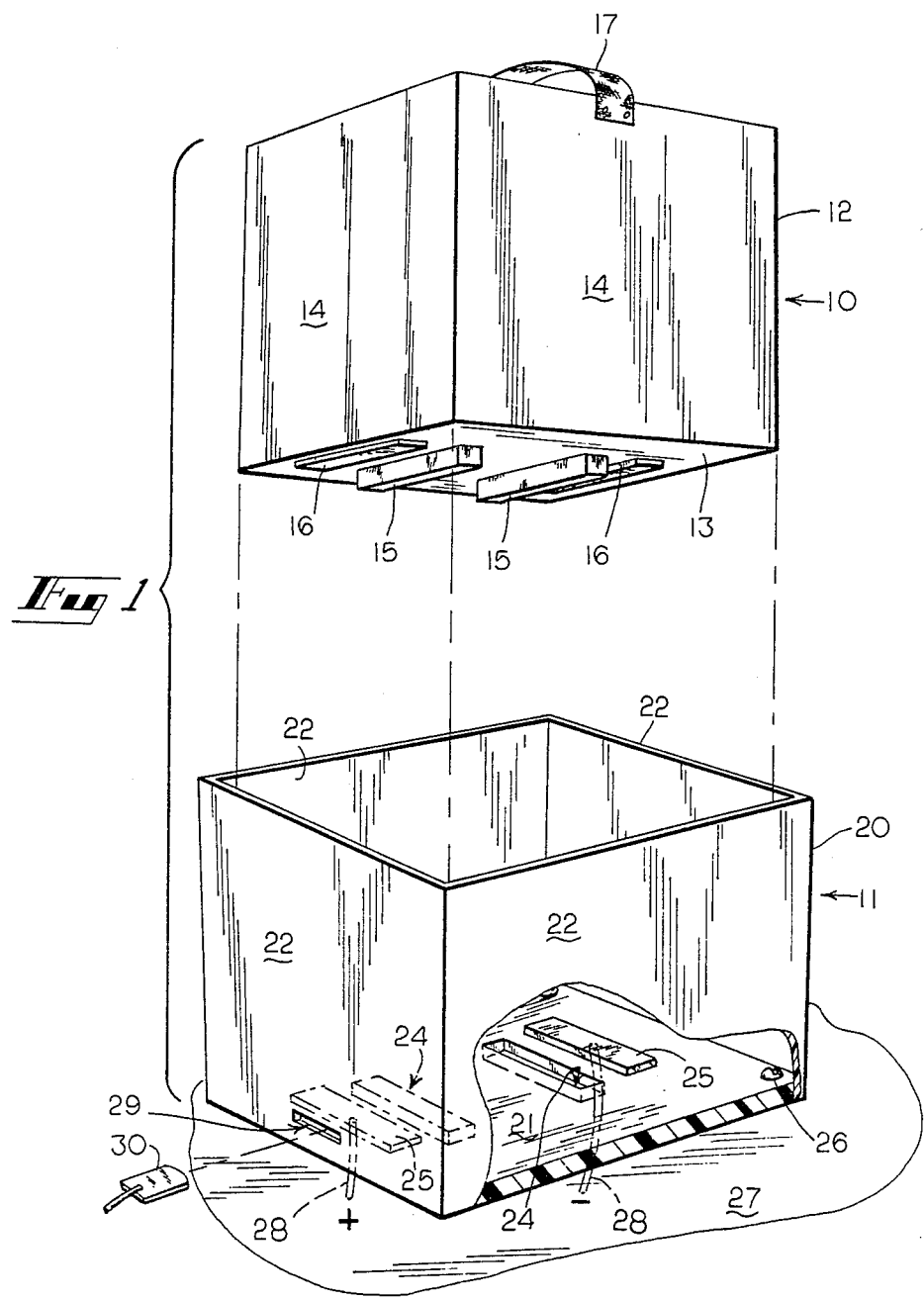

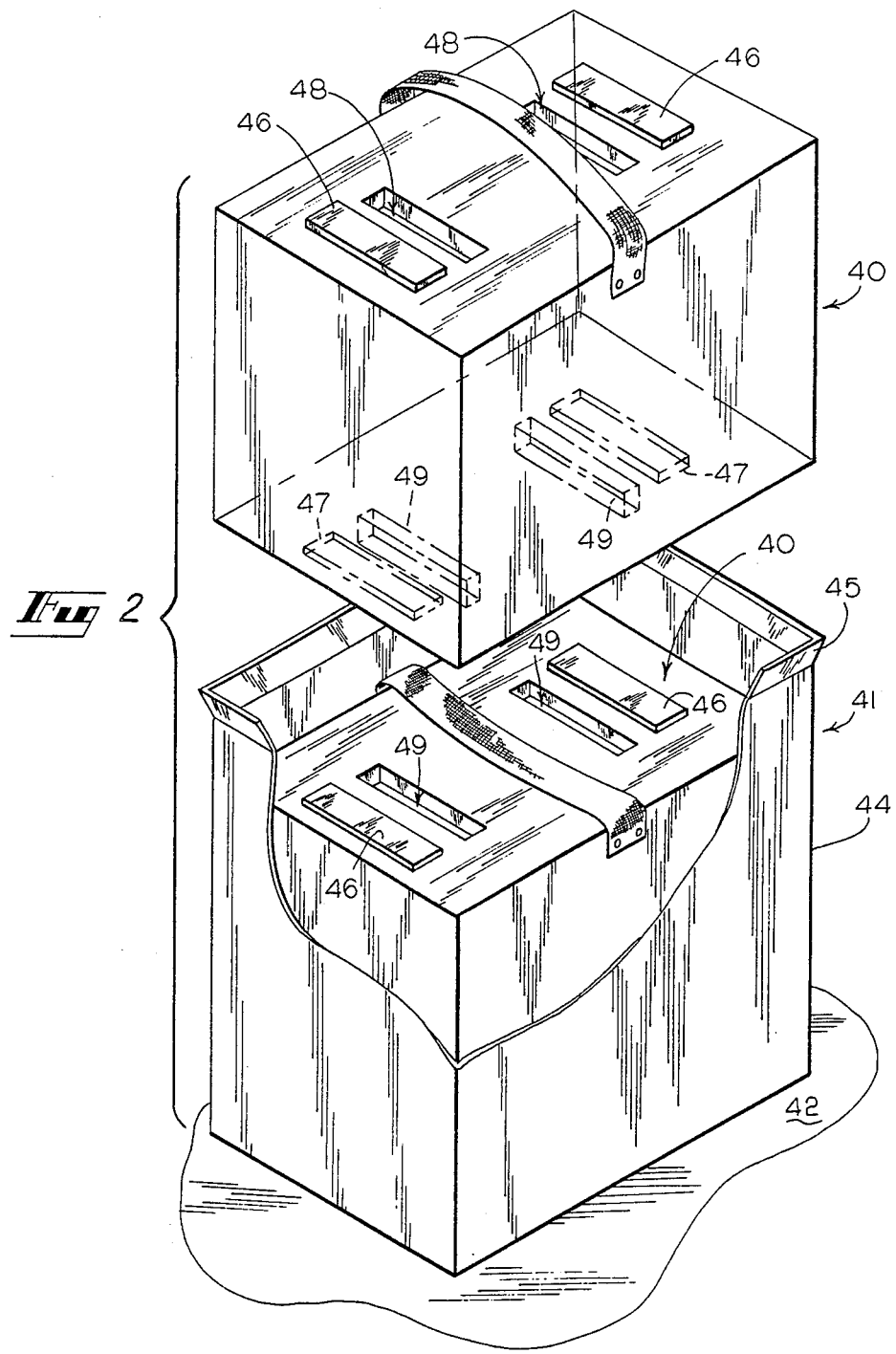

BATTERY AND MOUNT

TECHNICAL FIELD

This invention relates to batteries and battery mounts such as those used in automotive vehicles, boats and the like.

BACKGROUND OF THE INVENTION

Automotive vehicles and boats are conventionally equipped with a storage battery for use in starting the vehicle or boat engine and for powering electrical devices when the engine itself is not operating and generating electric power. The storage battery is typically secured to a mount or hold-down device as by the use of bolted straps or clamps. The battery terminals are usually in the form of posts that project upwardly from the top of the battery casing or case. The battery terminals are coupled to the vehicle or boat electrical system by means of soft, metallic connectors that are clamped tightly to the posts and by associated wiring.

The just described battery and mount arrangements have had a number of problems associated with their use for many years. For example, the batteries are often difficult to remove and replace upon the mounts due to the build-up of corrosion on the fastening means and due to the difficulty of locating the relatively heavy battery properly upon the mount or tie-down device. In addition, the battery terminals tend to become corroded which necessitates their having to being cleaned periodically and protected, as with lubricants, in order to prevent or impede such buildup. Otherwise, such corrosion can impair the electrical coupling between the terminals and connectors.

The just described problems have heretofore been addressed in several ways. For example, as exemplified by U.S. Pat. No. 1,903,448, storage battery terminals have been equipped with conductive straps that extend through a side of their casing to contact plates embedded in the sides of the battery for mating engagement with resilient contacts once placed within an installation or carrying case. This type of battery however is susceptible to being installed in a reverse orientation which can severely damage the battery and provide a personal hazard. Furthermore, only point contact may be established between the terminals of the battery and those of its carrying case. The resiliency of lead spring type contacts can also be impaired in time so as to render them brittle and susceptible to the buildup of corrosion.

In other cases, as exemplified by the battery shown in U.S. Pat. No. 4,331,749, post-type battery terminals have been substituted with conductive leads that extend from within the interior of the battery out of the battery case to insulated leads that may be flexed, routed and coupled to a terminal block. An advantage of this type of construction is that the terminals are located at a distance from the battery thereby providing a safety factor when connecting the terminals. Again, however, reverse coupling may be accidently effected, leading to severe damage. Also, a post and fastener arrangement still remains which necessitates the use of tools and which permits corrosion nevertheless to build.

U.S. Pat. No. 4,435,486 provides another type of connection of battery terminals to battery supporting case terminals wherein the battery terminals are mounted to the side of the battery for automatic contact and engagement with clamp type terminals of the case upon insertion. This approach, however, can place substantial torque and load upon the terminals if the battery terminals do not engage the case or enclosure terminals properly with the battery resting and supported on the floor of the case. Conversely, where the battery is on the floor its terminals may remain elevated slightly above the mount coupling devices rendering permanent coupling difficult to establish without torqueing and possibly skewing the clamp-like terminals themselves. Again, the clamps must normally be torqued by the use of a hand tool which may not be readily available.

It thus is seen that a need remains for a battery and mount for automotive vehicles, boats and the like which alleviates problems associated with the batteries and mounts of the prior art. It is to the provision of such therefore that the present invention is primarily directed.

SUMMARY OF THE INVENTION

A battery and mount combination comprises a battery having a case that has an underside to which a pair of battery terminals are mounted so as to be exposed to ambience. A mount has an open receptacle formed with an opening through which the battery may be manually inserted and removed. The receptacle has an interior floor to which a pair of electrodes are mounted upon which the battery terminals may be placed in direct contact while the battery is located and held within the receptacle.

In another form of the invention a battery and mount combination comprises a battery having a generally parallelpiped shaped case having a top, a bottom and four sides and having a pair of terminals that project downwardly from the bottom and which have lower flat surfaces. The combination also cmprises a mount having an open top box-shaped receptacle which has a floor from which four sides upwardly extend in which the battery may be manually set. The mount also has a pair of electrodes that project upwardly from the receptacle floor which have flat upper surfaces located to contact the battery terminals and support the battery.

BRIEF DESCRIPTION OF THE DRAWING

FIG. 1 is a an isometric view of a battery shown located above a mount for placement therewithin.

FIG. 2 is an isometric view of a battery located above a mount which embodies principles of the invention in an alternative form to that of FIG. 1.

DETAILED DESCRIPTION

With reference to FIG. 1 a storage battery, indicated generally at 10, is shown positioned directly above a mount, shown generally at 11. The battery has a parallelpiped shaped outer casing or case 12 which has a flat underside or bottom surface 13 from which four sides 14 upwardly extend to an unshown flat upper surface which is located parallel with the underside 13. A pair of legs 15 projects downwardly from the underside. A pair of flat electrical terminals 16 also projects downwardly from the underside 13 with their exposed, coplanar bottom surfaces located at a height above those of the legs 15. These electrodes are internally coupled with the internal battery plates in a conventional manner. It should be noted that both the legs 15 and the terminals 16 are located asymmetrically with respect to the bounds of underside 13. The battery is also provided with a flexible strap 17 which provides a collapsible handle for manipulating the battery.

With continued reference to FIG. 1, the mount 11 is seen to comprise an open top receptacle indicated generally at 20 which has a flat interior floor 21 about which four sides 22 upwardly extend. The walls 22 of the receptacle 20 are spaced apart a distance slightly greater than the width of the battery whereby the battery may be allowed a slight degree of movement or lateral play when located within the receptacle. The mount further comprises a pair of slots 24 formed in the floor 21 for loosely receiving the legs 15 of the battery. A pair of flat electrodes 25 is mounted upon the interior floor 21 in a position for alignment with the terminals 16 of the battery. Finally, a set of threaded bolts 26 is provided for rigidly mounting the receptacle 20 to a support 27 which may be part of the frame of a vehicle, boat or the like. The electrodes 25 are conventionally coupled to the electrical system of the vehicle or boat by insulated conductors 28.

With the mount 11 secured in the vehicle with its electrodes 25 connected to the electrical system of the vehicle, the battery 10 may be both physically mounted and electrically coupled with ease by merely lowering the battery 10 through the open top of the receptacle 20 until the battery terminals 16 directly engage and become supported upon the electrodes 25. It will be noticed that this may only be done in the orientation indicated in the drawing since were the battery rotated otherwise the legs 15 would not go into the slots 24 and the battery terminals would not contact the electrodes 25. Where properly placed, however, a direct electrical coupling is established and maintained in view of the fact that the weight of the storage battery is all placed upon the terminals 16 which are directly supported upon the electrodes 25.

As the vehicle, boat or the like is moved the battery is permitted a slight degree of lateral movement within the receptacle which movement tends to scrape any corrosion that may have begun to build between and about the terminals and electrodes. Thus, movement of the vehicle itself serves to keep the terminals and connectors clean. Once it becomes desirable to dismount the battery this is simply done by lifting the battery by the handle strap 17 out of the recpetacle. Then the battery may be set upon a supporting surface with its terminals 16 spaced from the support by the legs 15. Another battery of this type may then be substituted. If desired, the battery may be mounted within the receptacle oriented so that the terminals and electrodes are not coupled. For example, this may be desired for vehicle shipment or storage.

Finally, one of the walls 22 of the receptacle 20 is seen to be formed with a slot 29 which is located approximately at the height of the upper surface of one of the electrodes 25, which is indicated as being the positive one. This slot is provided so that a tongue-shaped terminal 30 of a jumper cable may be inserted into the receptacle and wedged between the positive battery terminal 16 and the positive electro 25 to "jump" the system from another power source. Once this is done the removal of the terminal 30 automatically causes the battery terminal 16 to fall back upon the electrode 25.

With reference next to FIG. 2 a battery and mount combination embodying principles of the invention in an alternative form is illustrated. Here, two batteries, indicated generally at 40, are illustrated as well as one battery mount, indicated generally at 41. The battery mount 41 is again rigidly mounted upon a support 42. The mount 41 is identical to the mount 11 shown in the previous embodiment with the exception that the open top receptacle 44 is slightly taller and has a flared upper lip 45 about it's periphery. The battery 40 is of the same construction as the battery 10 in the previous embodiment with the exception that here the battery has a pair of flat terminals 46 mounted asymmetrically upon its upper surface in direct alignment above a pair of flat terminals 47 mounted asymmetrically to its underside. Both are internally connected to the internal battery plates. Similarly, the battery has a pair of slots 48 formed on its upper surface directly aligned with and located above a pair of legs 49 that project downwardly from its underside. As shown in the drawing both of the batteries illustrated are of identical construction.

The battery and mount of FIG. 2 may be utilized in the manner previously described in conjunction with the description of the FIG. 1 embodiment. Here however it is seen that a second battery may be manually set directly upon a first battery that is already located within the mount receptacle. In this position in extended upper portion of the mount receptacle serves to hold the upper battery again with only limited lateral movement allowed therebetween. Once the upper battery is placed upon the lower battery its lower terminals 47 directly contact and are supported upon the upper terminals 46 of the lower battery. Thus, the batteries become electrically coupled in parallel to the electrical system of the vehicle or boat. This provides another manner of "jumping" the first battery when it is in a weakened condition. Thus, the receptacle 44 here does not have a slot in one of its sides.

It thus is seen that a battery and mount combination is provided which overcomes problems associated with those of the prior art. It should, however, by understood that the just described embodiments merely illustrate principles of the invention in two preferred forms. Many modifications, additions and deletions may, of course, be made thereto without departure from the spirit and scope of the invention as set forth in the following claims.

What is claimed is:

1. A battery and mount combination comprising a battery having a case that has an underside to which a pair of battery terminals are mounted so as to be exposed to ambience, and a mount having a receptacle formed with an opening through which said battery may be manually inserted and removed and with said receptacle having an interior floor to which a pair of electrodes is mounted upon which said battery terminals may be placed in direct contact with the battery located and and held within said receptacle, said battery terminals projecting downwardly from said case underside and having flat, bottom surfaces and said electrodes projecting upwardly from said receptacle interior floor and having flat, upper surfaces upon which said battery terminals may be supported and electrically coupled, and wherein said pair of battery terminals is mounted asymmetrically to said case underside whereby the battery may be set within said receptacle in either a position with said terminals in contact with said electrodes or a position with said terminals spaced from said electrodes.

2. A battery and mount combination comprising a battery having a case that has an underside to which a pair of battery terminals are mounted so as to be exposed to ambience, and a mount having a receptacle formed with an opening through which said battery may be manually inserted and removed and with said receptacle having an interior floor to which a pair of electrodes is mounted upon which said battery terminals may be placed in direct contact with the battery located and held within said receptacle, said battery terminals projecting downwardly from said case underside and having flat, bottom surfaces and said electrodes projecting upwardly from said receptacle interior floor and having flat, upper surfaces upon which said battery terminals may the supported and electrically coupled, and wherein said battery has a pair of legs that depends downwardly from said case underside below said terminals flat bottom surfaces, and wherein said receptacle floor has a pair of slots sized and configured to receive said pair of legs.

3. A battery and mount combination comprising a battery having a case that has an underside to which a pair of battery terminals are mounted so as to be exposed to ambience, and a mount having a receptacle formed with an opening through which said battery may be manually inserted and removed and with said receptacle having an interior floor to which a pair of electrodes is mounted upon which said battery terminals may be placed in direct contact with the battery located and held within said receptacle, said battery terminals projecting downwardly from said case underside and having flat, bottom surfaces and said electrodes projecting upwardly from said receptacle interior floor and having flat, upper surfaces upon which said battery terminals may be supported and electrically coupled, and wherein said battery case has a top side to which a second pair of battery terminals is mounted so as to be exposed to ambience and upon which another battery having a pair of terminals mounted on its case underside may be mounted with its pair of terminals in direct contact with said battery second pair of terminals.

4. A battery and mount combination comprising a battery having a case that has an underside to which a pair of battery terminals are mounted so as to be exposed to ambience, and a mount having a receptacle formed with an opening through which said battery may be manually inserted and removed and with said receptacle having an interior floor to which a pair of electrodes is mounted upon which said battery terminals may be placed in direct contact with the battery located and held within said receptacle, said battery terminals projecting downwardly from said case undersdie and having flat, bottom surfaces and said electrodes projecting upwardly from said receptacle interior floor and having flat, upper surfaces upon whcih said battery terminals may be supported and electrically coupled, and wherein one of said receptacle sides is formed with a slot located approximately at the height of one of said electrodes upper surfaces through which slot a tongue-shaped terminal of a jumper cable may be inserted and wedged between one of said battery terminals and one of said mount electrodes.

5. A battery and mount combination comprising a battery having a generally parallelpiped-shaped case having a top, a bottom and four sides and a pair of terminals that project downwardly from said bottom which have flat lower terminal surfaces, and a mount having an open top box-shaped receptacle having a floor from which four sides upwardly extend in which said battery may be manually set and having a pair of electrodes that project upwardly from said floor which have flat upper surfaces located to contact said battery terminals and support said battery, and wherein the inside dimensions of said mount are slightly greater than the outside dimensions of said battery whereby the battery may move slightly within said receptacle and said battery terminals slide upon said mount electrodes to effect a terminals and electrodes cleansing action, and wherein said battery has a flexible strap mounted thereto that transverses said top, and a second pair of terminals that project upwardly from said battery top straddling said flexible strap.

6. A battery and mount combination comprising a battery having a generally parallelpiped-shaped case having a top, a bottom and four sides and a pair of terminals that project downwardly from said bottom which have flat lower terminal surfaces, and a mount having an open top box-shaped receptacle having a floor from which four sides upwardly extend in which said battery may be manually set and having a pair of electrodes that project upwardly from said floor which have flat upper surfaces located to contact said battery terminals and support said battery, and wherein said battery has a second pair of terminals that project upwardly from said battery top and which have flat upper surfaces located in vertical alignment with said pair of battery terminals that project downwardly from said battery bottom whereby a plurality of said batteries may be set one atop the other with their terminals in contact.

7. The battery and mount combination of claim 6 wherein said mount receptacle sides are taller than said battery case sides whereby the receptacle may laterally support two of said batteries set one atop the other.

8. A battery and mount combination comprising a battery having a generally parallelpiped-shaped case having a top, a bottom and four sides and a pair of terminals that project downwardly from said bottom which have flat lower terminal surfaces, and a mount having an open top box-shaped receptacle having a floor from which four sides upwardly extend in which said battery may be manually set and having a pair of electrodes that project upwardly from said floor which have flat upper surfaces located to contact said battery terminals and support said battery, and wherein said battery has a set of legs that project downwardly from said case bottom below the level of said terminals, and wherein said mount receptacle floor is formed with a set of recesses to accommodate said legs when said battery is placed within said receptacle with said receptacle electrodes supporting said battery terminals.

9. A battery and mount combination comprising a battery having a generally parallelpiped-shaped case having a top, a bottom and four sides and a pair of terminals that project downwardly from said bottom which have flat lower terminal surfaces, and a mount having an open top box-shaped receptacle having a floor from which four sides upwardly extend in which said battery may be manually set and having a pair of electrodes that project upwardly from said floor which have flat upper surfaces located to contact said battery terminals and support said battery, and wherein said pair of battery terminals is mounted asymmetrically to said case underside whereby the battery may be set within said receptacle in either a position with said terminals in contact with said electrodes or a position with said terminals spaced from said electrodes.

10. A battery and mount combination comprising a battery having a generally parallelpiped-shaped case having a top, a bottom and four sides and a pair of terminals that project downwardly from said bottom which have flat lower terminal surfaces, and a mount having an open top box-shaped receptacle having a floor from which four sides upwardly extend in which said battery may be manually set and having a pair of electrodes that project upwardly from said floor which have flat upper surfaces located to contact said battery terminals and support said battery, and wherein one of said receptacle sides is formed with a slot located approximately at the height of one of said electrodes upper surfaces through which slot a tongue-shaped terminal of a jumper cable may be inserted and wedged between one of said battery terminals and one of said electrodes.

* * * * *